United States Patent [19]
Nachenberg et al.

[11] Patent Number: 5,765,030
[45] Date of Patent: Jun. 9, 1998

[54] PROCESSOR EMULATOR MODULE HAVING A VARIABLE PRE-FETCH QUEUE SIZE FOR PROGRAM EXECUTION

[76] Inventors: Carey S. Nachenberg, 19533 Citronia St., Northridge, Calif. 91324; Kevin R. Marcus, 1080 Spruce St. #5L, Riverside, Calif. 92507

[21] Appl. No.: 684,580

[22] Filed: Jul. 19, 1996

[51] Int. Cl.⁶ .............................. G06F 13/00; H04K 1/00; H04L 9/00
[52] U.S. Cl. ................. 395/183.09; 395/183.14; 395/187.01; 380/22; 380/50
[58] Field of Search ................... 395/183.01, 183.09, 395/183.14, 186, 187.01, 188.01; 380/3, 4, 22, 25, 49.1, 45, 50

[56] References Cited

U.S. PATENT DOCUMENTS

| | | | |
|---|---|---|---|
| 4,975,950 | 12/1990 | Lentz | 380/4 |
| 5,121,345 | 6/1992 | Lentz | 364/550 |
| 5,144,660 | 9/1992 | Rose | 380/4 |
| 5,319,776 | 6/1994 | Hile et al. | 395/575 |
| 5,321,840 | 6/1994 | Ahlin et al. | 395/700 |
| 5,349,655 | 9/1994 | Mann | 395/575 |
| 5,359,659 | 10/1994 | Rosenthal | 380/4 |
| 5,398,196 | 3/1995 | Chambers | 364/580 |
| 5,408,642 | 4/1995 | Mann | 395/575 |
| 5,421,006 | 5/1995 | Jablon et al. | 395/575 |
| 5,440,723 | 8/1995 | Arnold et al. | 395/181 |
| 5,442,699 | 8/1995 | Arnold et al. | 380/4 |
| 5,485,575 | 1/1996 | Chess et al. | 395/183.4 |

FOREIGN PATENT DOCUMENTS

| | | | |
|---|---|---|---|
| 0 636 977 A2 | 2/1995 | European Pat. Off. | G06F 11/00 |
| 063977 A2 | 2/1995 | European Pat. Off. | G06F 11/00 |

OTHER PUBLICATIONS

"Automated Program Analysis for Computer Virus Detection", *IBM Technical Disclosure Bulletin*, vol. 34, No. 2, Jul. 1991, pp. 415–416.

"Artificial Immunity for Personal Computers", *IBM Technical Disclosure Bulletin*, vol. 34, No. 2, Jul. 1991, pp. 150–154.

Marshall, G., "Pest Control", *LAN Magazine*, Jun. 1995, pp. 55,56,58,61,63,64 & 67.

(List continued on next page.)

*Primary Examiner*—Robert W. Beausoliel, Jr.
*Assistant Examiner*—Norman M. Wright
*Attorney, Agent, or Firm*—Fenwick & West LLP

[57] ABSTRACT

An emulation module (110) includes a pre-fetch queue (116) having an adjustable size (126) to eliminate any dependence of virus decryption routines on the size of the pre-fetch queue (116) when emulating executable files to test for the presence of virus infections. An executable file is tested by setting (210, 258) the size of the emulator's pre-fetch queue (116) and emulating (220) the file under the guidance of an emulation control module (130). Emulated instructions are monitored and a flag is set (230) when any instructions are modified (224) after being copied to the pre-fetch queue and subsequently executed (228). Emulation continues until the emulation control module (130) indicates (230) that the file should be scanned for virus signatures. If no virus signatures are detected (234) and the flag is set (244), the size of the pre-fetch queue is reduced (258) and the process is repeated. An executable file is declared virus-free (250) if the file is emulated (220) without setting the flag (230) and no virus signatures are detected (234). The executable file is declared virus-infected (240) when virus signatures are detected (234), independent of whether the flag is set (230). For Intel processors, pre-fetch queue sizes of 32, 16, 8, and zero bytes may be emulated.

11 Claims, 2 Drawing Sheets

OTHER PUBLICATIONS

Alan Solomon: "The Virus Authors Strike Back" Computer & Security, vol. 11, No. 7, Nov., 1992; pp. 602–606.

Laszlo Szilagyi: "Self–modiying code identifies uP type" EDN Electrical Design News, vol. 35, No. 9, 26 Apr. 1990, Newton, Massachusetts, US; pp. 232–234.

Veldman, Frans, "Virus Writing Is High–Tech Infosecurity Warfare", *Security on the I–Way '95*, 1995, pp. L–1–L–16, U.S.A.

Symantec Corporation, "Norton AntiVirus for Windows 95 & Special Subscription Offer", 1995, U.S.A.

"ThunderBYTE AntiVirus Utilities User Manual", Thunder-BYTE B.V., 1995, pp. i–191, Wijchen, The Netherlands.

"Virus Infection Techniques: Part 3", *Virus Bulletin*, Jan. 1995, pp. 006–007, Oxfordshire, England.

"UK–Sophos Intros Unix Virus Detection Software Jan. 26, 1995", *Newsbytes News Network*, Jan. 26, 1995, U.S.A.

Cohen, Frederick B., "A Short Course on Computer Viruses", *John Wiley & Sons, Inc.*, Second Edition, pp. 54–55, 199–209, 1994, U.S.A.

Veldman, Frans, "Heuristic Anti–Virus Technology", *Proceedings of the International Virus Protection and Information Security Council*, Apr. 1, 1994.

Karney, James, "Changing the Rules on Viruses; Trend Micro Devices Inc.'s PC Rx 4.0 virus Detection Software", *PC Magazine*, Aug. 1994, vol. 13, No. 14; p. NE36, U.S.A.

Wells, Joseph, "Viruses in the Wild", *Proceeding of the International Virus Protection and Information Security Council*, Apr. 1, 1994.

Gordon, Scott, "Viruses & Netware", *Proceedings of the International Virus Protection and Information Security Council*, Mar. 31, 1994.

Solomon, Alan, "Viruses & Polymorphism", *Proceedings of the International Virus Protection and Information Security Council*, Mar. 31, 1994.

Case, Tori, "Viruses: An Executive Brief", *Proceedings of the International Virus Protection and Information Security Council*, Mar. 31, 1994.

Gotlieb, Leo, "End users and responsible computing: Information Management", CMA—*the Management Accounting Magazine*, Sep. 1993, vol. 67, No. 7, p. 13, U.S.A.

"Network Management; LAN Buyers Guide: Network Management; Buyers Guide", *LAN Magazine*, Aug. 1992, vol. 7; No. 8, p. 188, U.S.A.

"Anti–virus Company Claims Polymorphic Breakthrough Jul. 10, 1992", *Newsbytes News Network*, Jul. 10, 1992, U.S.A.

Schnaidt, Patricia, "Security; data security issues, Lesson 44; Tutorial", *LAN Magazine*, Mar. 1992, U.S.A.

Skulason, Fridrik, "For Programmers", *Virus Bulletin*, Jul. 1990, pp. 10–11, Oxon, England.

Digitext, "Dr. Solomon's Anti–Virus Toolkit for Windows and DOS", *S&S International PLC*, Jan. 1995, pp. 1–15, 47–65, 75–77, 91–95, 113–115, and 123–142, United Kingdom.

PROCESSOR EMULATOR MODULE HAVING A VARIABLE PRE-FETCH QUEUE SIZE FOR PROGRAM EXECUTION

RELATED PATENT APPLICATIONS

This patent application is related to U.S. patent application Ser. No. 08/535,340, now U.S. Pat. No. 5,696,822, entitled "Polymorphic Virus Detection Module" and filed on Sep. 28, 1995. This patent application is also related to U.S. patent application Ser. No. 08/ entitled "Emulation Repair System" and filed on Feb. 9, 1996.

BACKGROUND OF THE INVENTION

1. Technical Field

The present invention relates to the field of software virus detection, and in particular, to systems for emulating executable computer files to detect software viruses.

2. Background Art

In order to detect virus-infected software, virus detection systems typically scan the files of a computer for combinations of instructions characteristic of different known viruses. This process has been made more difficult by the emergence of polymorphic viruses, which evade detection by infecting each new file with a mutated version of the virus. Providing each newly infected file with viral code having a different outward appearance frustrates standard virus detection methods that scan files for characteristic instruction strings.

Polymorphic viruses comprise a static virus body and a mutation engine. In the most common polymorphic viruses, the virus itself does not mutate. Rather, the mutation engine generates a virus decryption routine (polymorphic decryption loop) and uses the dual of this routine to encrypt the static virus body and the mutation engine. The new decryption routine and the newly encrypted virus body are then inserted into the host file. Common mutation strategies employed by the mutation engine include reordering of instructions, substituting equivalent instructions or equivalent sequences of instructions, inserting random "garbage" instructions (which have no effect on the virus functionality), interchanging function calls, in-line code, jump instructions (JMP), and the like, and using equivalent registers interchangeably.

One successful technique for detecting polymorphic viruses is cue-directed program emulation (CDPE). CDPE methods assume that the polymorphic code contains at least one section of machine code, the static virus body, that is consistent for each instance of infection. CDPE methods also assume that when executed, the decryption routine of the polymorphic virus deterministically decrypts the encrypted static virus body and transfers control to the static virus body when decryption is complete. CDPE methods emulate the polymorphic virus until it has decrypted itself and then analyze the decrypted virus body using standard scanning techniques.

In order to be effective, emulators must be able to step through enough instructions in a virus-infected file to decrypt the virus and expose the static virus body for scanning. However, polymorphic viruses include instructions in one part of their code, typically in the decryption loop, that modify instructions elsewhere in the virus code. This self-modifying character can cause a polymorphic virus to behave differently when infected files are run on processors having different pre-fetch queue sizes or on emulators for these processors. In particular, emulators for processors having different pre-fetch queue sizes can fail to decrypt polymorphic viruses if an instruction is loaded in a pre-fetch queue before its image in memory is modified. If the unmodified version of the instruction in the pre-fetch queue is executed and the instruction implements steps in the decryption process, parts of the virus will not be decrypted. Since CDPE systems scanners rely on signatures present in the decrypted static virus core, viruses that fail to decrypt properly will not be detected.

For example, Intel employs pre-fetch queue sizes of 8, 16, 32, and 64 bytes in its 286, 386, 486, and Pentium processors, respectively. Because of the potential impact of pre-fetch queue size on decryption of polymorphic viruses, an executable file that includes self modifying code may have to be emulated repeatedly in order to allow any virus present to decrypt itself properly.

Different virus detection schemes have been employed to address this issue. Some virus detection systems merely emulate the processor on which they are running. This approach ensures that viruses designed to run on the host processor will be fully decrypted provided the emulator accurately reflects the processor architecture. However, if the host processor is coupled through a network to processors having different pre-fetch queue size, these other processors may be infected through the network if their pre-fetch queue sizes allow the virus to properly decrypt itself. For example, a virus designed for an 8 byte pre-fetch queue may be tested on a processor emulator having a 16 byte pre-fetch queue. If the difference in queue size prevents the emulated virus from fully decrypting itself, the virus will not be detected. When the host file is downloaded to a system on the network run by an 8 byte processor, the virus may fully decrypt itself and cause damage.

Another alternative is to simply run each file through an emulator for each pre-fetch queue size. However, this strategy is extremely slow since every file would be emulated multiple times, whereas fewer than 1% of a typical user's files are infected by software viruses.

There is thus a need for an efficient means for emulating processor architectures having different pre-fetch queue sizes in order to test computer files software viruses.

SUMMARY OF THE INVENTION

The present invention is a system (110) and method (200) for emulating executable computer files for processors with different pre-fetch queue sizes (116, 126) to test for the presence of software viruses. The system and method eliminate decryption failures attributable to virus dependence on different pre-fetch queue sizes (116, 126), while minimizing the number of times each computer file must be emulated. In particular, the majority of uninfected executable files are emulated only once, while infected executable files are emulated a maximum of "n" times, where "n" is the number of different pre-fetch queue sizes supported by a particular processor family. For example, n=four for Intel's X86 processor family, which supports 8, 16, 32, and 64 byte pre-fetch queues.

In accordance with the present invention, a computer file is emulated (220) using the largest pre-fetch queue size available for a family of processors. If an instruction in memory corresponding to an instruction already loaded in the pre-fetch queue of the emulator is modified (224), and the unmodified instruction in the pre-fetch queue is subsequently executed (228), a flag is set (230). Emulation proceeds until an emulation control module determines that sufficient instructions have been emulated to scan (234) for virus signatures. If a virus signature scan turns up no virus signatures (234) and the flag is set (244), the pre-fetch queue size is reduced (258) and the emulation is repeated (220) using the smaller pre-fetch queue. If the virus scan turns up a virus signature (234), the file is tagged (240) infected, independent of the flag status. If the flag is not set (244), a file is tagged as virus-free (240) or infected (250) according to whether or not the virus scan identifies any virus signatures.

Emulation proceeds with successively smaller pre-fetch queue sizes. i.e. typically 32, 16, 8, and 0 bytes, until either a virus is found or no virus is found and no modification of queue-loaded instructions is detected.

BRIEF DESCRIPTION OF THE DRAWINGS

These and other features of the invention may be understood by reference to the following figures.

DETAILED DESCRIPTION OF THE PREFERRED EMBODIMENTS

Figure 1:
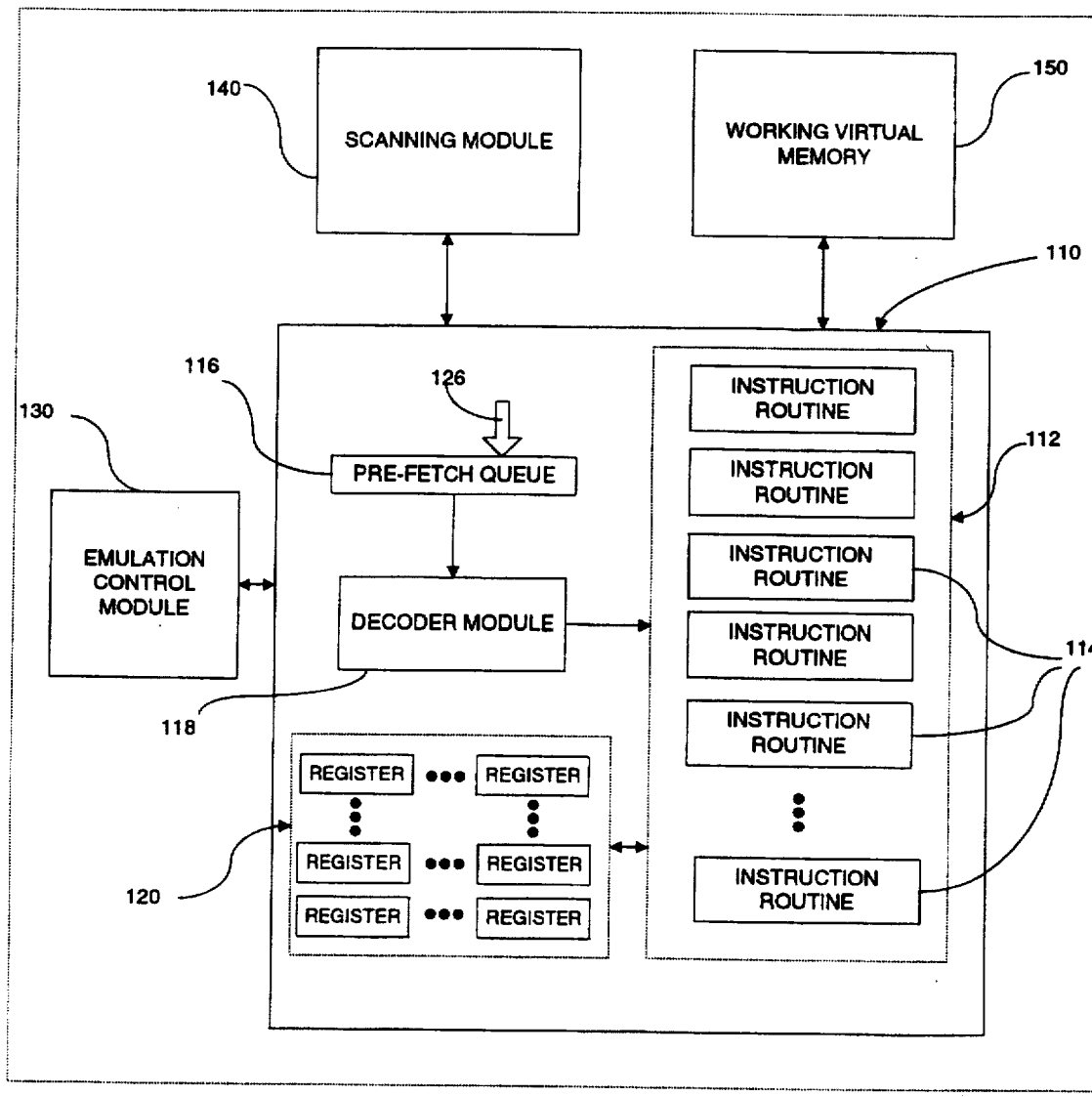
FIG. 1 is a block diagram of an emulation module in accordance with the present invention.

One of the most successful strategies for identifying computer files infected with polymorphic viruses is based on Cue Directed Program Emulation (CDPE). As indicated above, polymorphic viruses comprise a static virus core and a mutation engine that effectively encapsulates the static virus core within a decryption loop that changes with each instance of infection by the virus. CDPE-based systems emulate computer files under control of an emulation control module, which includes heuristics, rules, or other guidelines to determine whether the instructions being emulated are likely to be part of a decryption loop. When the emulation control module determines that the instructions being emulated are not those of a virus decryption loop, the file code is scanned for the presence of virus signatures. If none are present, the computer file is considered clean. On the other hand, if code consistent with the static virus body of a known virus is detected, the computer file is tagged as being infected.

Significantly, unless a file can be emulated to the point where the static virus code of an infecting virus is exposed, the virus can not be detected by CDPE methods. Viruses that are not properly or fully decrypted will escape detection, since the virus signatures, which are selected from the static virus core, will not be accessible to the scanning module. In particular, virus detection systems that employ emulators to step through the instructions of computer files, may fail to fully decrypt infecting viruses if the emulator does not simulate the instructions accurately. As noted above, a virus written for one version of a processor with a given pre-fetch queue size may not decrypt itself properly if simulated by an emulator for a the processor with a different pre-fetch queue size. This pre-fetch queue size dependence is a consequence of the fact that polymorphic viruses are self-modifying, i.e. they alter their own instruction codes as they run. Depending on the size of a processor's or emulator's pre-fetch queue, the write-back policy employed by the processor/emulator, and the relative proximity of the code-modifying instruction and the modified instruction, such modified instructions may not always be emulated properly.

The emulation problems created by running self-modifying code in processor emulators having different pre-fetch queue sizes can be understood by reference to the following assembly language code sequence:

| OFFSET | INSTRUCTION | HEXADECIMAL REPRESENTATION |
|--------|-------------|---------------------------|
| 100 | MOV BYTE PTR [105], 90h | C6 06 05 01 90 |
| 105 | MOV AX, 9090 | B8 90 90 |
| 108 | XOR AX, AX | 31 C0 |
| 109 | NOP | 90 |

Before execution of any instructions, the contents of the pre-fetch queue will be:

C6 06 05 01 90 B8 90 31 C0
↑

Similarly, before execution of any instructions, the contents of memory corresponding to the pre-fetched instructions will be:

C6 06 05 01 90 B8 90 31 C0
↑

Following execution of the first instruction, the contents of the pre-fetch queue are unchanged, since the instructions operate on the memory contents and the instruction in the pre-fetch queue were loaded before the first MOV instruction was implemented. Accordingly, following execution of the first instruction, the pre-fetch queue contents are:

C6 06 05 01 90 B8 90 90 31 C0.
↑

On the other hand, the contents of the corresponding memory locations will be:

C6 06 05 01 90 90 90 90 31 C0,
↑

The contents of the pre-fetch queue have not been altered by the "MOV" instruction, but the contents of memory have been altered according to the "MOV" instruction.

Following execution of the second instruction, the AX register contains "9090" as per the MOV AX, 9090 instruction in the pre-fetch queue. The instructions in memory, on the other hand, have been modified so that the original "MOV AX, 9090" instruction reads as three no-operation instructions (NOPs) in a row.

Since code is executed from the pre-fetch queue, the modified instructions in the above example will not be executed unless all changes to the memory locations having corresponding entries in the pre-fetch queue are detected and the instructions in the pre-fetch queue are updated to reflect the detected changes. Among the Intel microprocessors, this write through policy is implemented only on the Pentium processor. Consequently, the 64 byte pre-fetch queue of the Pentium processor is transparent to the software.

An executable file that includes self-modifying code can produce different results when executed by processors/emulators with different size pre-fetch queues. This ambiguity arises from the fact that copies of instructions exist in two locations in a computer system, the memory and the pre-fetch queue. The copy of the instruction in the pre-fetch queue is executed by the processor/emulator, while executed instructions are applied to locations in memory. Where an executed instruction modifies a second instruction in the code sequence (self-modifying code), the unmodified version or the modified version of the second instruction may be subsequently executed, depending on whether the second instruction is loaded into the pre-fetch queue before or after execution of the modifying instruction.

For example, the 8086 processor includes an 8 byte pre-fetch queue. Accordingly, a second instruction that is modified by a first instruction that precedes the second instruction by, for example, 10 bytes will be executed in its modified form. In this case, the copy of the second instruction in memory will not be loaded into the pre-fetch queue until after it is modified. On the other hand, if the second instruction is loaded from memory into the pre-fetch queue before the first instruction is executed, only the copy of the instruction in memory will be modified, and the unmodified copy of the instruction in the pre-fetch queue will be executed. An 80386 or an 80486 processor/emulator, which have 16 byte and 32 byte pre-fetch queues, respectively, will execute the unmodified version of the second instruction, since a copy of the second instruction will already be loaded in the pre-fetch queue by the time the copy in memory is modified.

Certain processors such as the Pentium series of Intel processors employ write-through cache policies for maintaining coherency between the contents of memory and the contents of the processor's 64 byte pre-fetch queue. The processors (and emulators for these processors) detect when memory locations are modified after the contents of the memory location are copied to the pre-fetch queue. The write through policy ensures that the contents of the pre-fetch queue are modified in accordance with the corresponding memory location.

Virus designer may use the fact that self-modifying code produces different results in processors/emulators having different pre-fetch queue sizes to their advantage. As long as the sequence of code being executed differs from the code sequence that decrypts the polymorphic virus infecting a computer file, the static virus core will not be exposed and the virus will escape detection. For example, a virus can be designed so that it does not decrypt itself properly in certain processors/emulators. Since the virus does not fully decrypt itself in these systems, the static virus core is never revealed and scanning will fail to detect the virus' presence. If the processor is networked with processors having pre-fetch queue sizes that allow the virus to fully decrypt itself, the virus can infect these sites on the network. Alternatively, virus designers may take advantage of known differences between the pre-fetch queue employed by a processor and the pre-fetch queue size emulated by a virus detection system to produce a virus that escapes detection when emulated but is viable in the actual processor.

As noted above, conventional solutions to the problem of pre-fetch queue size dependencies require either that each computer file be emulated once for each possible pre-fetch queue size or that the anti-virus system only detect viruses designed for the processor on which the anti-virus system is running. The first solution produces virus detection systems that are too slow to be practical, and the second solution produces virus detection systems that are easily circumvented where networks tie together computers having processor with different pre-fetch queue sizes.

The present invention is a system and method that efficiently detects polymorphic viruses, independent of the processor architecture for which the virus was designed, and does so without repeating emulations unnecessarily.

Referring now to FIG. 1, there is shown a block diagram of an emulation module 110 in accordance with the present invention. Emulation module 110 comprises various software modules 112, 116, 118, 120 that are implemented in a virtual memory segment 100 to emulate the behavior of a specified processor under control of a computer file (not shown) stored in an associated region 150 of virtual memory 100. For example, decoder module 118 is a software module that decodes instructions retrieved from virtual memory 150 and selects one of instruction routines 114 from execution module 112 to simulate execution of the decoded instruction. Registers 120 are locations in virtual memory segment 100 used by emulation module 110 to manipulate and process data. Pre-fetch queue module 116 may be a series of locations in virtual memory segment 100 that are loaded with instructions fetched sequentially from the computer file and subsequently loaded into decoder module 118 for execution via routines 114. Arrow 126 indicates that the number of memory locations available in pre-fetch queue module 112 may be adjusted to mimic pre-fetch queues of different sizes.

Also shown in FIG. 1 is an emulation control module 130 and a scanning module 140, which operate in conjunction with emulation module 110 to detect virus infected computer files. Emulation control module 130 monitors the instructions being emulated and determines when enough instructions have been emulated to scan the computer file for virus signatures. This determination is made in accordance with the heuristics, rules, or guidelines associated with emulation control module 130. These may include instruction sequences, the presence or absence of which indicate when the virus is likely to have decrypted itself. An emulation control module, described in U.S. patent application Ser. No. 08/535,340, employs instruction profiles for known viruses as guidelines for determining whether a code sequence being emulated may be attributed to a virus. The scanning module then scans areas of memory executed through or modified by the emulated instructions, looking for sequences of instructions that are characteristic of the static viral codes of different viruses.

Figure 2:
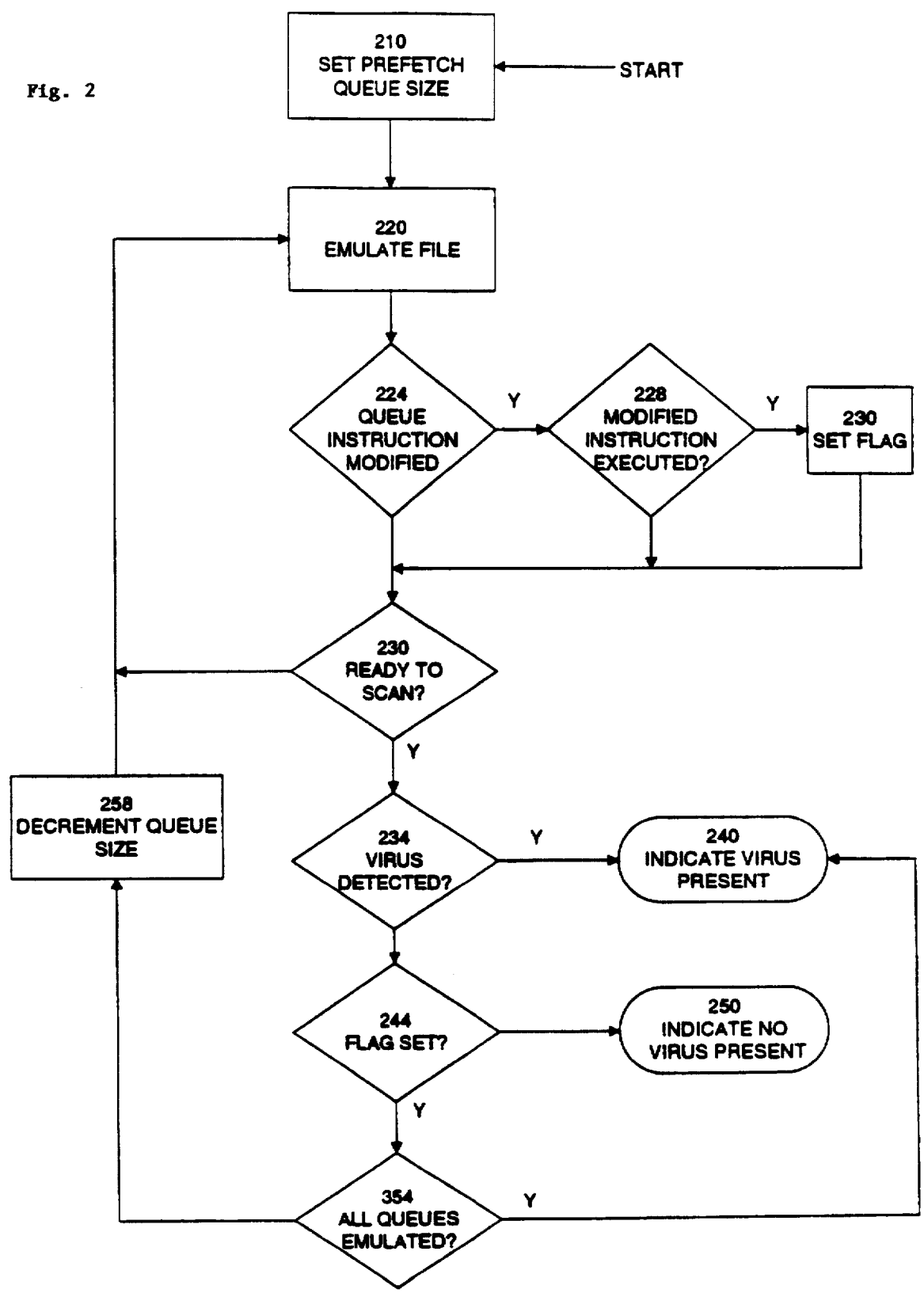
FIG. 2 is a flow chart of a method implemented by the emulation module of FIG. 1.

Referring now to FIG. 2, there is shown a flow chart of a method in accordance with the present invention, for detecting virus infected computer files written for processors with different pre-fetch queue sizes while minimizing the number of time each file is emulated. Initially, the size of the pre-fetch queue is set 210 to the largest value pre-fetch queue size employed in a family of processors without a write-through cache policy. For example, Intel processors with 8, 16 and 32 byte pre-fetch queues, the size of the pre-fetch queue would initially be set to 32 bytes. The Pentium processor has a 64 byte pre-fetch queue but employs a buffered write-through cache policy.

Once the size of the pre-fetch queue has been set 210, a computer file is emulated 220. If an emulated instruction modifies 224 an instruction in memory that has already been loaded into the pre-fetch queue and, if the instruction (in the pre-fetch queue) is subsequently emulated 228, a flag is set 230. Emulation continues until the emulation control module indicates that the computer file should be scanned 230 for virus signatures. If a virus is detected 234 by the scan, its presence is indicated 240. If no virus is detected 234 and the flag is not set 244, a clean status is indicated 250. In this case, since no pre-fetch queue modification occurred, there is no ambiguity in the code scanned for virus signatures. If the flag is set 244 and smaller queue sizes, including the effectively zero byte pre-fetch queue of the Pentium, remain to be emulated, the size of the pre-fetch queue is decremented 258 and the computer file is reemulated with the smaller pre-fetch queue size.

Method 200 ensures that a computer file that includes self modifying code will eventually be emulated in a processor architecture in which the modified code is executed. This eliminates the possibility that the emulated code leads to a different result, i.e. no decryption, from that obtained when the code is run on a different processor, i.e. decryption followed by viral damage. Since few non-viral programs include self-modifying code, most uninfected computer files will be emulated only once. By beginning with the architecture having the largest pre-fetch queue buffer, the present invention ensures that any program including self modifying code that may execute unmodified code (and so not run to full decryption) will be detected.

As an example, an executable file infected by a virus including a first instruction that modifies a second instruction four bytes behind it in the prefetch queue, may have to be tested with a 32 byte, a 16 byte, an 8 byte, and a zero byte pre-fetch queue (Pentium architecture) on an Intel processor emulator before the virus is properly decrypted.

There has thus been provided a system and method for emulating executable computer files to detect software viruses in which self-modifying code sequences may otherwise prevent detection of the virus code. The emulator includes a pre-fetch queue module, the size of which may be varied to reflect the pre-fetch queue sizes employed by different versions of a processor architecture. Executable computer files are emulated to decode any polymorphic viruses present and only those executable files that contain self-modifying code, which is rarely used by non-viral code, are emulated more than once. For those files that do include self-modifying code, emulations are repeated with different size pre-fetch queues until any dependence on the pre-fetch queue size is eliminated or a virus signature is detected.

What is claimed is:

1. A computer-implemented method for emulating a computer file in a processor emulator having a selectable pre-fetch queue size, to detect a computer virus, the method comprising the steps of:

selecting a pre-fetch queue size for the emulator;

emulating instructions of the computer file;

setting a first flag when an emulated instruction modifies another instruction within the selected pre-fetch queue size and the modified instruction is executed;

scanning the emulated computer file for a virus signature;

reducing the pre-fetch queue size and repeating the emulating, setting, and scanning steps when the first flag is set and no virus signature is found; and indicating a virus is not present when the first flag is not set and no virus signature is found.

2. The method of claim 1, wherein the selecting step comprises the substeps of:

identifying a plurality of pre-fetch queue sizes supported by versions of the processor being emulated; and selecting a largest of the plurality of pre-fetch queue sizes as the pre-fetch queue size for the emulator.

3. The method of claim 2, wherein the step of reducing the pre-fetch queue size comprises reducing the pre-fetch queue size to a next largest pre-fetch queue size of the plurality of supported pre-fetch queue sizes.

4. The method of claim 1, comprising the additional step of indicating a virus is present when the first flag is set and a virus signature is found.

5. The method of claim 1, comprising the additional step of indicating a virus is not present when the first flag is not set and no virus signature is found.

6. A computer-implemented method for detecting a virus in a computer file using a processor emulator having a pre-fetch queue characterized by a queue size, the method comprising the steps of:

emulating instructions of the computer file;

setting a first flag when an emulated instruction modifies another instruction in the pre-fetch queue and the modified instruction is subsequently emulated;

scanning the emulated computer file for a virus signature;

indicating a virus is detected if the virus signature is found;

indicating no virus is detected if no virus signature is found and the flag is not set; and;

decrementing the pre-fetch queue size and repeating the emulating, setting, and scanning steps when the first flag is set and no virus signature is found.

7. The method of claim 6, comprising the additional step of setting the pre-fetch queue size to a largest pre-fetch queue size supported by versions of the processor being emulated prior to the emulating step.

8. The method of claim 7, wherein the decrementing step comprises the substeps of:

determining a plurality of pre-fetch queue sizes supported by versions of a processor being emulated; and adjusting the pre-fetch queue size of the emulator to a next largest supported pre-fetch queue size relative to the pre-fetch queue size currently being emulated.

9. The method of claim 6, wherein the step of setting a first flag comprises the substeps of:

comparing the size of the pre-fetch queue with a spacing between the modifying instruction and the modified instruction;

setting the first flag if the spacing is no larger than the size of the pre-fetch queue and the modified instruction is subsequently emulated.

10. A processor emulation module for emulating executable computer files running on versions of a processor having different size pre-fetch queues, the emulation module comprising:

a pre-fetch queue module for receiving a plurality of instructions from the executable computer file, the pre-fetch queue module having an adjustable size;

a decoder module coupled to the pre-fetch queue module for identifying an instruction received from the pre-fetch queue module;

an execution module coupled to the decoder module and including a plurality of instruction routines corresponding to instructions supported by the processor versions, the instruction routines being activated when the corresponding instruction is identified by the decoder module; and a plurality of register modules coupled to the plurality of instruction routines for tracking a state of the emulated processor version according to instructions emulated by the execution module.

11. A computer-readable storage medium on which is stored data for simulating versions of a processor as a processor emulator having different pre-fetch queue sizes, the data being suitable for implementation by a processor to perform the steps of:

selecting a pre-fetch queue size for the emulator;

emulating instructions of the computer file;

setting a first flag when an emulated instruction modifies another instruction within the selected pre-fetch queue size and the modified instruction is executed;

scanning the emulated computer file for a virus signature;

reducing the pre-fetch queue size and repeating the emulating, setting, and scanning steps when the first flag is set and no virus signature is found; and indicating a virus is not present when the first flag is not set and no virus signature is found.

* * * * *

UNITED STATES PATENT AND TRADEMARK OFFICE
CERTIFICATE OF CORRECTION

PATENT NO.    : 5,765,030
DATED         : June 9, 1998
INVENTOR(S)   : Carey S. Nachenberg et al.

It is certified that error appears in the above-identified patent and that said Letters Patent is hereby corrected as shown below:

<u>Title page,</u>
Please add Assignee as follows:

-- [73]  Assignee: Symantec Corporation, Cupertino, CA (US) --

Signed and Sealed this

Twentieth Day of May, 2003

JAMES E. ROGAN
*Director of the United States Patent and Trademark Office*